H. B., W. P. AND D. P. CRUM.
APPARATUS FOR MECHANICALLY TILLING THE SOIL.
APPLICATION FILED SEPT. 21, 1915.

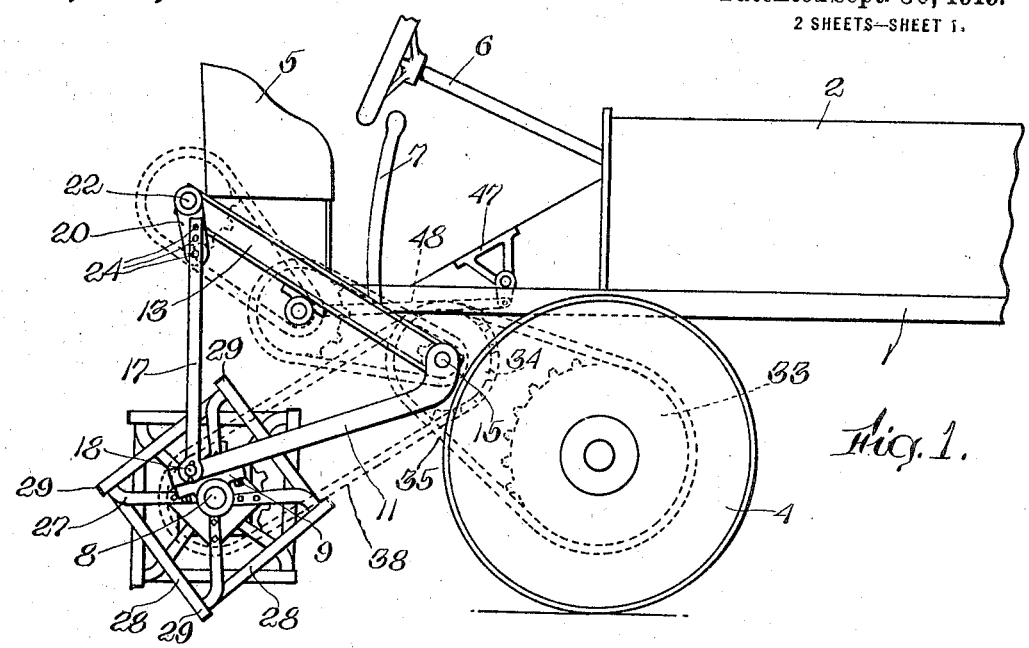
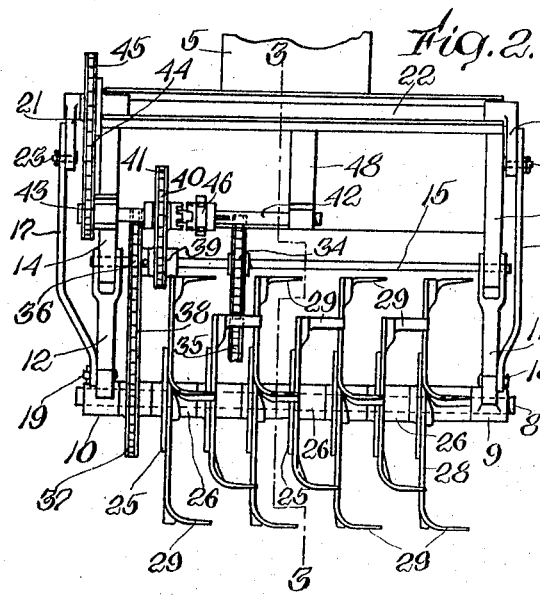

1,317,432.

Patented Sept. 30, 1919.
2 SHEETS—SHEET 2.

UNITED STATES PATENT OFFICE.

HOLLIS B. CRUM, WILLIAM P. CRUM, AND DANA P. CRUM, OF CHICAGO, ILLINOIS.

APPARATUS FOR MECHANICALLY TILLING THE SOIL.

1,317,432.                 Specification of Letters Patent.      Patented Sept. 30, 1919.

Application filed September 21, 1915. Serial No. 51,785.

*To all whom it may concern:*

Be it known that we, HOLLIS B. CRUM, WILLIAM P. CRUM, and DANA P. CRUM, all citizens of the United States, and residents of Chicago, county of Cook, and State of Illinois, have invented an Improvement in Apparatus for Mechanically Tilling the Soil, of which the following description, in connection with the accompanying drawings, is a specification, like letters on the drawings representing like parts.

The object of the present invention is to provide an apparatus for mechanically tilling the soil, and particularly capable of use in soil where a mass of vegetation, roots, and undergrowth must be cut. To this end we have devised an apparatus, including a tractor or automobile body and novel forms of combined cutting and plowing devices, together with means to raise and lower the cutting and plowing instrumentalities, means to regulate the depth to which the plow will cut, and means to have the plowing and cutting devices coöperate with and aid in the forward movement of the tractor. A further important feature of the present invention consists in the novel form and arrangement of the plows, which are so formed as to be automatically self-clearing, preventing the tangled roots and earth from being raised up and clogging the plow and thereby throwing an extra load on the tractor. Also, practically all the power developed by the motor in the tractor may be exerted on the plowing devices, which additional power is used for the propulsion of the tractor and entire machine, the plowing devices being rotatable in the same direction as the rotation of the driving wheels, and preferably geared to have a greater speed than the driving wheels. Still other important features are that the plowing and cutting devices are so arranged as to effect a drawing or slashing cut to facilitate the work of the machine on roots and undergrowth; that the plowing devices are overlapping so as to cut any root, undergrowth, etc., into short sections, whether lying crosswise or lengthwise of the line of movement of the tractor; that the raising and lowering of the plowing devices is under the control of the operator at all times during the continuous forward movement of the machine and capable of instantly being raised by power mechanism, to avoid rocks or other obstacles; and that the plowing and slashing devices are of strong, yet simple construction, and of a novel form to impart the cutting, plowing, self clearing, and forwardly pushing action.

In mechanically driven plowing devices as heretofore constructed, the automobile or tractor part of the mechanism has usually had to be of sufficient weight, strength and power to drag the plowing devices through the soil, but this of course is impossible in any soils where roots, undergrowth and the like present an impassable obstacle to an ordinary plow. In many soils, particularly in the southeastern part of the United States, in the Carolinas and in the Everglades of Florida, the soil is incapable of standing a heavy load, such as the ordinary tractor dragging a plow, and by our present invention we are enabled to produce a very light tractor, capable of operating in these relatively soft soils as well as in ordinary tillable ground. The arrangement whereby the plowing devices serve to aid in the forward movement of the machine, instead of constituting a drag, also enables a light weight engine and tractor to be constructed. We preferably make the plowing devices detachable from the tractor, so that after the soil has been slashed and plowed, other plowing or harrowing devices may be attached to the tractor and the preparation of the soil completed. We also may arrange the tractor so that the plowing, or other devices, are contained within the limits of the length of the tractor itself, thus enabling the entire area of a field to be tilled, our tractor being capable of backing into corners if desired; then lowering the plow and starting off, thus reaching every corner and turn, our apparatus not requiring a wide space to turn in.

Other features of the invention, novel details of parts, and advantages will be hereinafter more fully pointed out and claimed.

Referring to the drawings, illustrating preferred embodiments of our invention,

Figure 1 is a side view, in outline, showing the rear of our machine;

Fig. 2 is an end view of the cutting and plowing device;

Fig. 3 illustrates the transmission mechanism to rotate the plowing devices on the line 3—3 of Fig. 2;

Figure 4:
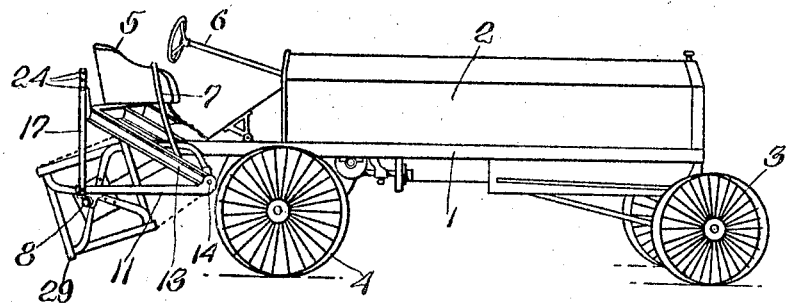
Fig. 4 is a view on a smaller scale of the entire tractor with the plowing devices in raised position clear of the ground.
Figure 5:
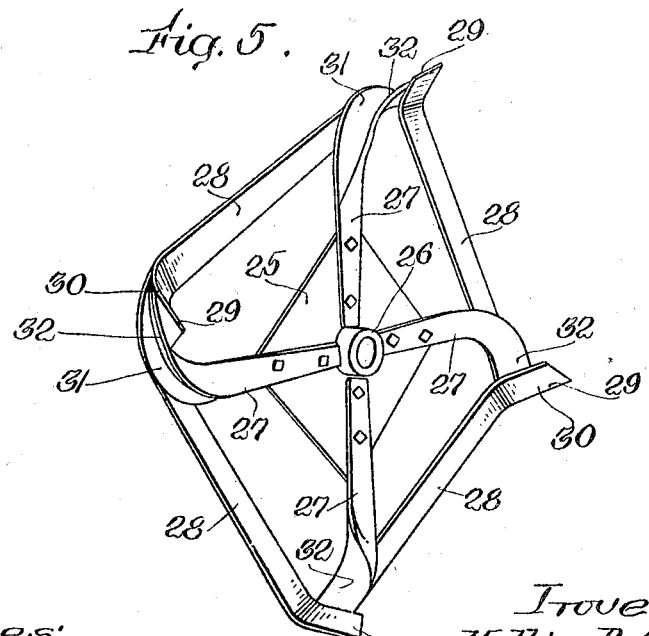
Fig. 5 is an enlarged perspective view of our novel form of cutting and plowing device.

Referring to the form illustrated in Figs. 1 to 5, the tractor or automobile portion of our machine which may be of any suitable form, style or type, has the strong side frames 1 carrying the engine inclosed within the body 2 and equipped with forward steering wheels 3 and rear driving wheels 4 and suitable transmission from the engine in the body with reverse and control mechanism. These wheels are of suitable width to carry the load when intended to operate over soft ground, such as that in the Florida Everglades. A driver's seat 5, steering and control post 6, brake 7, and the like, are arranged at the rear of the tractor and mounted on the overhanding portion of the side bars 1.

The cutting and plowing devices are positioned underneath the driver's seat at the rear of the tractor and are mounted on a shaft 8 which is held in bearings 9 and 10 bolted or otherwise secured to links 11 and 12 respectively. These links have their other ends forked to straddle brackets 13 and 14 secured to the rear of the side frames 1 and said links are pivoted thereto by a shaft 15, as clearly shown in Fig. 2. In order to raise and lower the outer end of the links 11 and 12 carrying the bearings and shaft 8, we provide rods 16 and 17 pivoted to said links at 18 and 19 respectively, and also pivoted at their upper ends to cranks 20 and 21, keyed to opposite ends of a shaft 22 by means of removable pins 23. We prefer to form a plurality of holes in each upper end of the rods 16 and 17, as indicated at 24, so as to provide an adjustment for different vertical movements of the rods, and consequently a larger range of adjustment for the plowing devices, to take care of different sizes or depths to which the apparatus may operate. Rotation of the shaft 22 and movement of the cranks 20 and 21 will, of course, raise or lower the outer ends of links 11 and 12, and hence raise or lower the plowing devices carried on the shaft 8. Any suitable means may be fitted to rotate the shaft 22, but we prefer to connect the same with power actuated mechanism, so that the driver can instantly raise the entire plowing device from the ground, as when going over an obstacle, or when desired to vary the depth to which the plowing devices are operating, and during the continued forward movement of the machine. The power mechanism to raise or lower the plowing devices will be explained later.

Our novel form of cutting and plowing devices are designed to rotate in the same direction as that of the driving wheels and are mounted on the shaft 8. These cutting and plowing devices, as clearly shown in Fig. 5, consist of a light spider or framework, comprising a center plate 25 carrying a central hub 26, which hub is adapted to fit upon the shaft 8 and to be keyed, or otherwise secured thereto in any adjusted position around the shaft. To the central plate 5 are secured spoke-like members 27 and at their outer ends the plow-like braces 28 are welded or riveted together, each member 27 extending to and making a corner with the adjacent brace 28. Either the members 27 or the braces 28 may be extended at these corners and turned or flared in a position substantially at right angles to the entire member to constitute the cutting or plowing instrumentalities. We prefer to utilize the braces 28, extending their alternate ends into the projecting cutting and soil turning portion 29, with the edge 30 constituting the slashing or cutting portion. This edge may be sharpened, if desired, but we prefer to make the braces 28 of thin, narrow sheet steel which ordinarily gives a sufficiently sharp portion to cut roots and underbrush. We also prefer to make the members 27 with their outer ends split, or of doubled sheet material, to enable one layer 31 to be welded to the end of a brace 28 and the other portion 32 to be welded to and turned up with the cutting and plowing portion 29 of the adjacent brace 28, thus giving a strong construction for the plowing members. These projecting portions 29 extend a slightly greater distance than the length of the hub 26, in order to permit adjacent plows to be mounted on the shaft 8 with the hubs contacting, and yet to have the cutting portions 29 overlapping, so as to cut pieces between two adjacent portions 29. In mounting the plow members on the shaft 8, we prefer to arrange each alternate rotary plow within the portions 29 "staggered" substantially as illustrated in Figs. 1, 2, and 3, and to secure the same upon the shaft 8 as so positioned.

It is desired to drive the shaft 8 carrying the plowing devices as a portion of the driving mechanism of the rear wheels 4, but at a considerably greater speed of rotation than that of the rear wheels, so that the plowing devices will act with a forward thrusting movement on the entire machine. Thus in moderately firm soil, the driving mechanism of the tractor retards the movement of the plowing members, and enables the power developed by the motor in the tractor to be all delivered to the plowing members. On the other hand, with the plowing members raised out of contact with the earth, the power developed by the motor is all delivered to the rear driving wheels to move the tractor. Therefore the power of the motor is applied proportionately to the rotating plow members, or to the driving wheels of the tractor, depending upon the resistance offered to the plow members, and in either event is acting to move the machine forwardly. During the operation of the machine, the driver can regulate the depth to which the plowing members will cut, and may also raise the plow entirely from the ground while proceeding along intervening spaces or the like, as well as to back into corners to till the entire area of a field.

Any suitable and appropriate driving mechanism connecting the motor of the tractor with the rear wheels 4 and shaft 8 may be employed, the driving connection between the motor and the rear wheels 4 not being herein illustrated, but being delivered in any desired manner to the rear axle, on which driving axle is secured a pulley 33. From the pulley 33 power is transmitted to a pulley 34 by a sprocket chain 35, which pulley 34 is fixed on the shaft 15, constituting the pivots for the links 11 and 12 and therefore with this shaft concentric with the raising and lowering movement of the shaft 8 carrying the rotary plow members. On the shaft 15 another pulley 36 transmits power to a pulley 37 on the shaft 8 by a chain 38, as illustrated in Figs. 1, 2, and 3. Thus raising and lowering of the rotary plow members will not affect the drive from the shaft 15.

In order to raise and lower the rotary plow by power mechanism, we provide a connection between the shafts 15 and 22. Keyed on the shaft 15 is a small pulley 39 belted by the chain 40 to the pulley 41, which pulley normally runs loosely on an intermediate shaft 42, mounted in suitable brackets. The outer end of the shaft 42 carries a pulley 43 connected by a chain 44 to a wheel 45, keyed to the shaft 22, and a clutch 46 is arranged to slide on said shaft 42 and to be operated by a foot treadle 47 through a rod 48. Movement of the foot treadle 47 acts to clutch the member 46 keyed on the shaft 42 with the continuously rotating pulley 41, and hence to transmit power from the pulley 43 to the shaft 42, swinging the cranks 20 and 21 and consequently raising or lowering the links 16 and 17 and the plow-like members on the shaft 8 during their continuous rotative movement. The plow members being raised or lowered as far as desired, the clutch 46 is thrown out and the plow retained in the position to which it may be thus moved, either by a brake or by the friction of the gearing.

As a means for preventing damage to the rotary plow, we prefer to so arrange the links 16 and 17 and cranks 20 and 21 that with the plow in normal lowered position, as illustrated in Fig. 1, the cranks will be slightly forward, off a dead center, so that if the plowing members strike a stone or obstacle, they may lift or raise, the links 16 and 17 and cranks 20 and 21 permitting this upward movement at any time.

Having described our invention, what we claim as new and desire to secure by Letters Patent is:

1. Apparatus of the kind described, including a plurality of rotary plow-like members, a shaft, a plurality of cutter carrying devices adapted to fit upon said shaft, each device having a hub, arms radially extending therefrom, braces uniting said arms at their outermost extremities, each brace extending to an adjacent arm and beyond said arm, a flange formed by the extending portion of each brace, said flange being formed at an angle with the radial arms, and constituting a plowlike cutter, said flange having a portion parallel with the shaft, and corresponding flanges of adjacent devices being staggered and of a length sufficient to overlap said flange cutting portions.

2. A rotatable plow like cutter for tractors and the like, comprising a rotatable cutter adapted for forward rotation at a speed greater than the driving speed of the tractor, comprising a plurality of rotatable cutter members, each member interchangeably fitting in said rotary cutter and having soil-cutting projections with a cutting portion extending parallel with the axis of rotation, each cutter member having a hub, a spider extended from said hub and supporting peripheral links arranged as a square having cutting points at each corner of said square, said cutting portions extending parallel with the hubs and for a greater length than that of its hub, whereby the cutting portions of one member overlap the corresponding cutting portions of adjacent members.

In testimony whereof, we have signed our names to this specification, in the presence of two subscribing witnesses.

HOLLIS B. CRUM.
WILLIAM P. CRUM.
DANA P. CRUM.

Witnesses:
G. M. WEIMER,
H. M. MYERS.